US011533900B2

(12) United States Patent
Graef et al.

(10) Patent No.: US 11,533,900 B2
(45) Date of Patent: Dec. 27, 2022

(54) APPARATUS FOR DISPENSING FLOWABLE MEDIA AND A METHOD FOR OPERATING AN APPARATUS FOR DISPENSING FLOWABLE MEDIA

(71) Applicant: agrotop Gmbh, Obertraubling (DE)

(72) Inventors: Steffen Graef, Obertraubling (DE);
Thomas Schenk, Neuffen (DE);
Martin Ziermann, Schwarzach (DE)

(73) Assignee: AGROTOP GMBH

( * ) Notice: Subject to any disclaimer, the term of this patent is extended or adjusted under 35 U.S.C. 154(b) by 511 days.

(21) Appl. No.: 16/704,814

(22) Filed: Dec. 5, 2019

(65) Prior Publication Data

US 2020/0178512 A1    Jun. 11, 2020

(30) Foreign Application Priority Data

Dec. 5, 2018 (DE) ...................... 10 2018 130 941.4

(51) Int. Cl.
*A01M 7/00*      (2006.01)
*B05B 15/652*    (2018.01)
*A01C 23/00*     (2006.01)
*A01C 23/04*     (2006.01)

(52) U.S. Cl.
CPC ........... *A01M 7/006* (2013.01); *A01C 23/008* (2013.01); *A01C 23/047* (2013.01); *A01M 7/0042* (2013.01); *B05B 15/652* (2018.02)

(58) Field of Classification Search
CPC . A01M 7/006; A01M 7/70042; B05B 15/652; A01C 23/008; A01C 23/0047

USPC ....... 239/159, 160, 164, 166, 169, 172, 176; 47/57.5
See application file for complete search history.

(56) References Cited

U.S. PATENT DOCUMENTS 3,625,428 A   12/1971  Mecklin ................... 239/166
3,874,593 A *  4/1975  Wilt ....................... A01M 7/00
                                                  239/172

(Continued)

FOREIGN PATENT DOCUMENTS

FR    2409003    6/1979    ............. A01G 17/02
FR    2508273    6/1981    ............. A01M 7/00
FR    2921543    4/2009    ............. A01G 17/00

OTHER PUBLICATIONS

German Office Action (w/machine translation) issued in application No. 10 2018 130 941.4, dated Oct. 1, 2019 (10 pgs).

(Continued)

*Primary Examiner* — Steven J Ganey
(74) *Attorney, Agent, or Firm* — Hayes Solowy P.C.

(57) ABSTRACT

An apparatus for spraying flowable media and in particular plant protection agents onto plants, has at least a first spray unit and a second spray unit wherein each of the spray units has a tubular conduit unit that extends in a predetermined longitudinal direction and is suitable and intended for conducting a flowable plant protection agent, and wherein each of the spray units has at least one spray head that is in flow communication with the conduit unit associated therewith. The spray units are provided in a pivotable manner in relation to a predetermined pivot axis on a carrier, and the apparatus has an adjustment unit that allows both the first spray unit and the second spray unit to be pivoted between a working position and an idle position.

15 Claims, 1 Drawing Sheet

(56) References Cited

U.S. PATENT DOCUMENTS

| | | | | |
|---|---|---|---|---|
| 4,350,294 A | * | 9/1982 | Gaspard | A01M 7/005 |
| | | | | 239/169 |
| 4,512,516 A | | 4/1985 | Ballu | 239/168 |
| 9,894,892 B2 | * | 2/2018 | Lawrence | A01C 23/006 |
| 2017/0354137 A1 | | 12/2017 | Dahlhauser et al. | A01M 7/006 |

OTHER PUBLICATIONS

European Office Action (w/machine translation) issued in application No. 19213722.2, dated Apr. 3, 2020 (21 pgs).

* cited by examiner

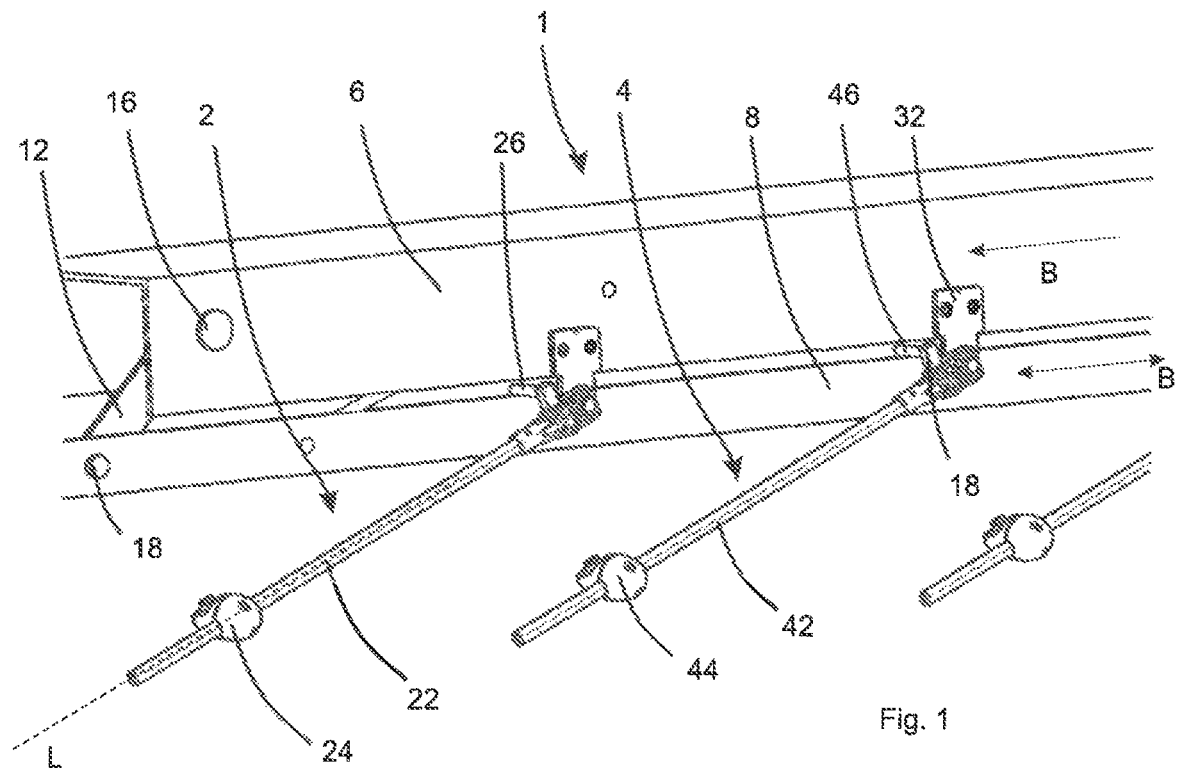
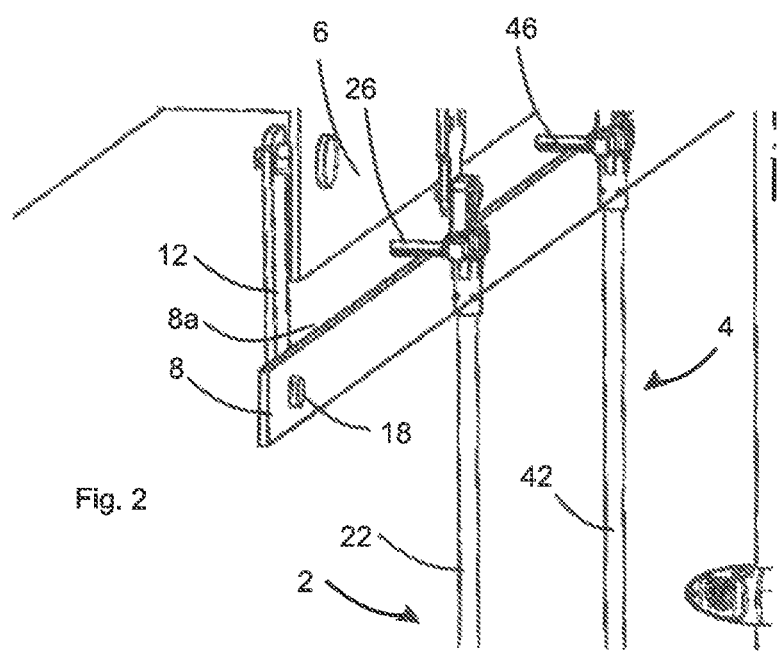

APPARATUS FOR DISPENSING FLOWABLE MEDIA AND A METHOD FOR OPERATING AN APPARATUS FOR DISPENSING FLOWABLE MEDIA

BACKGROUND OF THE INVENTION

The present invention relates to an apparatus for dispensing flowable media and in particular to an apparatus for dispensing plant protection agents, insecticides and the like. It has been known for a long time in the area of agriculture to dispense flowable, i.e. in particular liquid or gaseous agents such as plant protection agents, liquid fertilisers and the like onto plants.

With some applications it is required in agriculture, in the case of comparatively high plants, for these agents to be dispensed to lower regions of the plants. For this purpose, spray booms are known for which the Applicant uses the brand name Dropleg®.

They include a tubular body that is used for guiding the respective agent to be dispensed, as well as an application unit such as for example a nozzle that dispenses the agent onto the plants. Such spray booms are arranged for example next to each other on a carrier, so that they can be transported through the individual rows of the respective plant material. Once repositioning is required, for example when another row is supposed to be treated, it is conventional in the prior art to take these booms off and mount them subsequently in a new position. However, this approach is relatively complex.

In particular in the case of under-flower treatment, for example of rapeseed, increasingly higher requirements are imposed on plant protection. Therefore, the booms mentioned above are used, which do not spray in the region of the flowers of the plants and ensure a high level of bee protection. When the farmer has to drive into a new row, the booms have to be folded in as well. This requires, as mentioned above, for the booms to be taken off each time. As a result, such a system becomes less acceptable.

The use of such dispensing units, which are referred to by the Applicant also as Droplegs, has been known for a long time, also in the case of special cultures. In the case of special cultures, a higher expenditure of time is accepted because treatment with plant protection agents is not possible in any other way. The booms are mounted on site, for example mounted to a spray unit, and the plant protection treatment is carried out.

If needed, the sprayer is filled up on site. In the case of solutions known from the prior art, dispensing units provided on such booms are connected to each other via cable pulls. In this case, however, it may occur that the movements of the individual dispensing units are no longer completely free, but they are in each case interlocked with those of neighbouring dispensing units. If one of the dispensing units is excessively deflected, then this is transferred to the adjacent dispensing unit, and this in turn can lead to severe damage to the plants or may render treatments in that particular row impossible.

SUMMARY OF THE INVENTION

The present invention is therefore based on the object of allowing on the one hand a simplified movement of the dispensing units into an idle position, and on the other hand to prevent an at least excessively strong coupling between the individual booms.

An apparatus according to the invention for spraying flowable media and in particular plant protection agents onto plants has at least a first spray unit and a second spray unit, wherein each of the spray units has a tubular conduit unit that extends in a predetermined longitudinal direction and is suitable and intended for conducting a flowable medium and in particular a plant protection agent, and wherein each of the the spray units has at least one spray head that is in flow communication in each case with the conduit unit associated therewith.

According to the invention, the spray units are provided to be pivotal in relation to a predetermined pivot axis on a carrier, and the apparatus has an adjustment means that allows both the first spray unit and the second spray unit to pivot between a working position and an idle position.

It is therefore proposed to arrange the individual spray units, in particular the spray units referred to as Droplegs above, to be pivotable on a carrier and to be in particular pivotable in an area, so that these can be pivoted or folded from a working mode into an idle mode.

In general, the spray units could also be referred to as application units, which are suitable and intended for applying a flowable medium onto plants.

Preferably, the flowable medium may be dispensed at least in the working position of the spray units. Preferably, the spray units may be transported in the idle position thereof and may in particular be transported between different areas to be sprayed. Particularly preferably, in an idle position of the spray unit, the respective spray head thereof is located at a higher level (in relation to a vertical direction) than in a working position.

In a further preferred embodiment, the spray units or the tubular conduit units thereof are substantially vertically orientated in the idle position, whilst "substantially vertical" is being understood to mean in particular that the longitudinal directions of the conduit units deviate from the exactly vertical orientation by no more than 20°, preferably by no more than 15°, preferably by no more than 10° and particularly preferably by no more than 5°.

In a further advantageous embodiment, the apparatus includes a drive unit for the adjustment unit. This may here be for example a pneumatic drive unit. This would be particularly favourable because modern tractors are often equipped with pressurised air connections. However, also an electric or magnetic or a hydraulic drive unit would be conceivable.

In a further advantageous embodiment, the apparatus has more than two spray units, preferably more than three and preferably more than four spray units, preferably more than 10 spray units, preferably more than 20 spray units and preferably more than 30 spray units. Particularly preferably, several and particularly preferably all of these spray units are pivotable as mentioned above, so as to be moved from a working position into an idle position.

It is possible that the spray units are manufactured from different materials, for example from metal or also from plastic. Apart from that, the spray units may also be manufactured from several different materials.

In a particularly preferred embodiment, a pivoting movement of the first spray unit in at least one pivoting direction is not coupled with the pivoting movement of the second spray unit.

Particularly preferably, in at least one position of the adjustment unit, the pivoting movement of the first spray unit is not coupled with the pivoting movement of the second spray unit, and/or the first spray unit may be pivoted independently of the second spray unit.

This may in particular be the working position of the apparatus according to the invention, in which the spray units preferably have a certain degree of pivotability, however the pivoting movements are not coupled with each other, in a further advantageous embodiment, the first spray unit and the second spray unit are not coupled with each other.

As mentioned above, the apparatus preferably has several spray units. Advantageously, these individual spray units are not coupled with each other. In this way, a pivoting movement of the first spray unit does not have any effect on the pivoting movement of the second spray unit, and they are preferably completely freely movable relative to each other.

Thus the invention relates to a unit that allows, in a mounted condition, the spray units to be applied in a position, for example on a boom.

It is possible here that one displacement unit is attached per part width section, in a further advantageous embodiment, the pivot axis of the spray units is perpendicular to the longitudinal direction of the conduit unit. Particularly preferably, a longitudinal direction of the spray unit is located in the pivoting plane. In a further advantageous embodiment, the pivoting plane is also perpendicular to a driving direction, for example of a tractor, which carries the present invention.

In a further advantageous embodiment, the spray unit can be pivoted about an angle that is greater than 10°, preferably greater than 20°, preferably greater than 30° and preferably greater than 40°.

In a further advantageous embodiment, the spray unit can be pivoted about a pivoting angle that is smaller than 180°, preferably smaller than 160°, preferably smaller than 140°, preferably smaller than 120° and particularly preferably smaller than 100° and preferably smaller than 90° and preferably smaller than 80°.

In a further advantageous embodiment, the adjustment unit is movable relative to the carrier. Particularly preferably, the adjustment unit can be linearly moved relative to the carrier.

In a further advantageous embodiment, a distance between the adjustment unit and the carrier may be modified by a movement of the adjustment unit relative to the carrier. It is possible that the carrier extends in a widthwise direction (which is perpendicular to a driving direction of a vehicle on which the spray units are provided), and also that the adjustment unit is perpendicular to this direction. This widthwise direction may for example be a direction that is perpendicular to a movement direction or driving direction of a tractor.

Particularly preferably, the adjustment unit also extends In said widthwise direction. Particularly preferably, the direction in which the adjustment unit extends, and the widthwise direction and the direction in which the carrier extends, are parallel to each other. Particularly preferably, the adjustment unit is movable relative to the carrier in the widthwise direction. Particularly preferably, a linear translatory movement along the booms or the carrier is carried out. This will particularly preferably trigger a lifting movement also in relation to height. The height direction is here understood to be in particular a vertical direction.

At an upper end of the spray units, small noses or projections may be attached, which are taken along by the adjustment unit.

In a preferable embodiment, the adjustment unit is designed as a web-like elongated element.

In a particularly preferred embodiment, the adjustment unit is connected to the carrier via at least one coupling element and preferably via at least two coupling elements. It is possible for these coupling elements to be provided on the carrier so as to be pivotable. Apart from that, these coupling elements are preferably also disposed on the adjustment unit to be pivotable. Thus, these may be for example connection webs that are articulated both to the carrier and also to the adjustment unit.

In a further advantageous embodiment, a projection is provided on at least one spray unit, which projection contacts the adjustment unit in particular in at least one position of the adjustment unit. This projection (at least temporarily or in particular during the movement of the spray unit from the working position into the idle position) may rest on an upper edge of the adjustment unit.

Advantageously, this projection is designed as a pin- or rod-shaped body.

In a preferred embodiment, there is no mechanical contact in the working position between the adjustment unit and the spray unit and/or between the adjustment unit and the projection. Particularly preferably, this projection is designed in such a way that an idle position of the adjustment unit exists in which there is no contact between the adjustment unit and the projection. In this position, the spray units can therefore pivot freely and are in particular not prevented in the pivoting process by the adjustment unit.

Thus, the great advantage consists in the fact that the spray units can move freely within the culture during use and do not influence each other.

If the boom or the adjustment unit is lifted in particular on the headland or at the end of a spray operation, all of the spray units hang vertically downwards. In a further step, the displacement unit can be operated and the spray units can be taken along by the lower crossbeam, i.e. in particular the adjustment unit, and can preferably also be placed against the carrier or the boom.

Subsequently the whole boom can be folded up as known from the prior art. In this way, it is possible to reduce the extension in the widthwise direction as well.

Particularly preferably, the carrier therefore comprises a first carrier portion and a second carrier portion, which can be pivoted and/or folded relative to each other.

As a result of the different design of the boom or the carrier and/or the adjustment unit it may also be of advantage to design the displacement movement not in a translatory manner, but in a rotary movement. To this end, a shaft is advantageously provided, in which in turn the above-described noses or projections rest, which are provided on the spray units.

It would also be possible to use eccentrically designed adjustment units that can be rotated or pivoted for example about an axis that extends parallel to the carrier. These adjustment units could each contact the above-mentioned projections so as to achieve the pivoting of the spray units.

In a further advantageous embodiment, the projection is provided on the spray unit via a cantilever. In this way, the pivoting movement of the spray unit can be simplified. In a further advantageous embodiment, the spray unit has a connection unit for connecting a feed conduit for feeding a plant protection agent or generally the flowable medium. The connection unit may be a coupling element that can be coupled or decoupled without the use of a tool. This coupling element may for example the designed as a plug-in coupling or as a bayonet coupling.

In a further preferred embodiment, the apparatus has a feed unit and in particular a feed conduit that feeds the flowable medium to the individual spray units It is also possible for this feed conduit to supply several spray units with the flowable medium.

In a preferred embodiment, connection conduits are provided which connect this feed conduit with the individual spray units. In a preferred embodiment, these connection conduits may be flexible conduits such as in particular, but not exclusively, hose connections. These hoses may in particular be designed with regard to their flexibility in such a way that they allow the spray units to be pivoted.

In a further preferred embodiment, regulating and/or blocking units may be provided between the feed conduit and the individual spray units, which are suitable and intended to block or regulate a liquid flow arriving at the spray units. In this way, for example flow controllers and/or valves may be provided.

As mentioned above, the drive unit for carrying out the movement may be a pneumatic driving means, in particular a driving means that includes pneumatic cylinders.

In a further preferred embodiment, the spray unit and/or also further elements, such as in particular the carrier and/or the adjustment unit, are made of plastic. In particular, these are parts that are manufactured using an injection moulding process.

The present invention is further directed to a method for operating an apparatus for spraying plants with flowable media and in particular with plant protection agents, wherein in a working position, the flowable medium is dispensed to the plants by at least a first spray unit and a second spray unit, wherein the spray units each have a tubular conduit unit that extends in a predetermined longitudinal direction and which conducts the flowable media, and wherein the spray units each have at least one spray head for dispensing the flowable medium, which are each in flow communication with the conduit unit respectively associated therewith.

According to the invention, the spray units are pivoted for transferring the apparatus from the working position into an idle position in relation to a predetermined pivot axis, wherein the spray units are pivotally provided on a carrier, and wherein by means of an adjustment unit, a pivoting of both the first spray unit and the second spray unit between a working position and the idle position is carried out.

BRIEF DESCRIPTION OF THE DRAWINGS

Further advantages and embodiments will become evident from the attached figures, wherein:

FIG. 1 shows an illustration of an apparatus according to the invention; and

FIG. 2 shows a detailed illustration of the apparatus shown in FIG. 1.

DETAILED DESCRIPTION OF THE INVENTION

FIG. 1 shows an illustration of an apparatus 1 according to the invention. Reference numeral 6 relates to a carrier that can be mounted for example on an agricultural machine such as a tractor. A plurality of spray units 2, 4 is provided on this carrier 6. These spray units may here be pivoted in a plane that is substantially in the figure plane. Reference numeral 32 identifies a fastening means, by which the pivoting units for pivoting the spray unit 2, 4 are fastened to the carrier. This fastening means may be fixed to the carrier 6, e.g. screwed on.

Reference numerals 24 and 44 each relate to spray heads that are provided on conduit units 22, 42. These conduit units may here also be made of plastic and have a certain degree of flexibility. It would also be possible for two or even more spray heads to be provided on each conduit unit. In this way, the respective medium may be applied to the plants at different heights.

Reference numeral 8 identifies an adjustment unit used for pivoting the spray units 2, 4. To this end, the spray units 2, 4 have projections 26, 46 that rest on a top side of the adjustment unit 8. Reference numeral L identifies a longitudinal direction of the spray units or the conduit unit thereof.

The adjustment unit 8 may be moved in the direction of the double arrow B, wherein B being at the same time the widthwise direction of the carrier and also of the adjustment unit. To this end, coupling elements or webs are provided via joints 16 and 18 between the carrier 6 and the adjustment unit 8. Therefore, a movement of the adjustment unit 8 also leads to a lifting or lowering of this adjustment unit, and in this way, the pivoting operation of the spray units 2, 4 may be initiated.

FIG. 2 shows an illustration, in which the adjustment unit 8 is in the lowermost position. It can be seen that the coupling element 12 is here also vertically orientated. In this case, the upper edge 8a does not contact the projections 26 and 46. For this reason, the spray units 2, 4 may pivot unhindered without being coupled to each other.

The cantilever 18 shown in FIG. 1, via which the projections are disposed on the spray units, causes the spray units to be pivoted in a purposeful manner in a direction, as the adjustment unit 8 is lifted, which means in a counter-clockwise direction in FIG. 1.

The Applicant reserves the right to claim ail of the features disclosed in the application documents as being essential to the invention, insofar as they are novel over the prior art either individually or in combination. It is further pointed out that also features were described in the individual figures, which may be advantageous taken by themselves. A person skilled in the art will immediately recognise that a certain feature described in a figure may be advantageous even without adopting further features from this figure. A person skilled in the art MI further realise that advantages may be achieved also by a combination of several features shown in individual or in different figures.

LIST OF REFERENCE NUMERALS

2 Spray units
4 Spray units
6 Carrier
8 Adjustment unit
16 Joints
18 Joints
18 Cantilever
22 Conduit units
24 Spray heads
26 Projection
32 Fastening means
42 Conduit units
44 Spray heads
46 Projection
8a Upper edge
B Widthwise direction of the carrier and the adjustment unit
L Longitudinal direction

The invention claimed is:

1. An apparatus for spraying flowable media onto plants, comprising at least a first spray unit and a second spray unit, wherein each of the spray units has a tubular conduit unit that extends in a predetermined longitudinal direction and is suitable and intended for conducting a flowable plant protection agent, and wherein each of the spray units has at least one spray head that is in flow communication with the conduit unit associated therewith, wherein the spray units are provided in a pivotable manner in relation to a predetermined pivot axis on a carrier, and the apparatus has an adjustment unit that allows both the first spray unit and the second spray unit to be pivoted between a working position and an idle position, wherein the adjustment unit is movable relative to the carrier, wherein a direction in which the carrier extends, as well as a direction in which the adjustment unit extends, are parallel to each other, and/or the adjustment unit is in communication with the carrier via at least two coupling elements, and in that these coupling elements are provided to be pivotable on the carrier and on the adjustment unit.

2. The apparatus as claimed in claim 1, wherein a pivoting movement of the first spray unit in at least one pivoting direction is not coupled to the pivoting movement of the second spray unit.

3. The apparatus as claimed in claim 1, wherein the pivot axis is perpendicular to the longitudinal direction of the conduit unit.

4. The apparatus as claimed in claim 1, wherein the spray unit can be pivoted about a pivoting angle that is greater than 10°.

5. The apparatus as claimed in claim 4, wherein the spray unit can be pivoted about a pivoting angle that is greater than 20°.

6. The apparatus as claimed in claim 4, wherein the spray unit can be pivoted about a pivoting angle that is greater than 30°.

7. The apparatus as claimed in claim 4, wherein the spray unit can be pivoted about a pivoting angle that is greater than 40°.

8. The apparatus as claimed in claim 1, wherein a distance between the adjustment unit and the carrier can be modified by a movement of the adjustment unit relative to the carrier.

9. The apparatus as claimed in claim 1, wherein a projection is provided on at least one spray unit, which projection contacts the adjustment unit.

10. The apparatus as claimed in claim 1, wherein in the working position, there is no mechanical contact between the adjustment unit and the spray unit and/or between the adjustment unit and the projection.

11. The apparatus as claimed in claim 1, wherein the projection is provided on the spray unit via a cantilever.

12. The apparatus as claimed in claim 1, wherein the spray unit has a connection unit in order to connect a supply conduit for supplying the plant protection agent.

13. The apparatus as claimed in claim 1, wherein the flowable media comprises plant protection agents.

14. A method for operating an apparatus for spraying flowable media onto plants, wherein in a working position, the flowable medium is dispensed onto the plants by at least a first spray unit and a second spray unit, wherein each of the spray units has a tubular conduit unit that extends in a predetermined longitudinal direction and which conducts the flowable medium, and wherein each of the spray units has at least one spray head for dispensing the flowable medium, which is respectively in flow communication with the conduit unit associated therewith, wherein the spray units being pivoted in relation to a predetermined pivot axis for transferring the apparatus from the working position into an idle position, wherein the spray units are pivotally provided on a carrier and wherein a pivoting movement of both the first spray unit and the second spray unit between a working position and the idle position is carried out using an adjustment unit, wherein the adjustment unit is movable relative to the carrier, and a direction in which the carrier extends and a direction in which the adjustment unit extends are parallel to each other, and/or the adjustment unit is movable relative to the carrier, wherein the adjustment unit is in communication with the carrier via at least two coupling elements, and these coupling elements are provided to be pivotable on the carrier and on the adjustment unit.

15. The method of claim 14, wherein the flowable media comprises plant protection agents.

* * * * *